(12) United States Patent
Hollatz et al.

(10) Patent No.: US 7,373,387 B2
(45) Date of Patent: May 13, 2008

(54) SESSION TO TRACK ACTUAL E-MAIL HANDLING TIME

(75) Inventors: Mike Hollatz, Huntley, IL (US); David Wesen, Channahon, IL (US); Jeff Hodson, Wheaton, IL (US); Roger Sumner, Batavia, IL (US)

(73) Assignee: Rockwell Electronic Commerce Technologies, Wood Dale, IL (US)

( * ) Notice: Subject to any disclaimer, the term of this patent is extended or adjusted under 35 U.S.C. 154(b) by 836 days.

(21) Appl. No.: 10/788,231

(22) Filed: Feb. 26, 2004

(65) Prior Publication Data

US 2005/0193071 A1 Sep. 1, 2005

(51) Int. Cl.
*G06F 15/16* (2006.01)
(52) U.S. Cl. ............... 709/206; 709/207; 379/265; 379/266
(58) Field of Classification Search ........ 709/206–207; 379/265–266, 88.22, 88.17
See application file for complete search history.

(56) References Cited

U.S. PATENT DOCUMENTS

| | | | |
|---|---|---|---|
| 6,029,164 A | 2/2000 | Birrell et al. | |
| 6,058,163 A * | 5/2000 | Pattison et al. | 379/265.06 |
| 6,073,142 A | 6/2000 | Geiger et al. | |
| 6,233,318 B1 | 5/2001 | Picard et al. | |
| 6,389,028 B1 | 5/2002 | Bondarenko et al. | |
| 6,496,580 B1 | 12/2002 | Chack | |
| 6,895,438 B1 * | 5/2005 | Ulrich | 709/227 |
| 7,023,979 B1 * | 4/2006 | Wu et al. | 379/265.11 |
| 2001/0024497 A1 * | 9/2001 | Campbell et al. | 379/265.09 |
| 2004/0057569 A1 * | 3/2004 | Busey et al. | 379/265.09 |

\* cited by examiner

*Primary Examiner*—Frantz B. Jean
(74) *Attorney, Agent, or Firm*—Welsh & Katz, Ltd.

(57) ABSTRACT

A method and apparatus are provided for measuring a time of considering an e-mail message received by an agent of an automatic contact distribution system. The method includes the steps of detecting each opening and closing of the e-mail received by the agent, measuring an elapsed time between each detected opening and closing of the e-mail and summing the measured elapsed times between the openings and closings of the e-mail to provide a cumulative total time for preparing the response to the e-mail.

21 Claims, 2 Drawing Sheets

```
SUBSCRIBE sip: UA@agent20.com    SIP/2.0
Via: SIP/2.0/UDP 4.3.2.1
To: UA<sip:UA@agent20.com>
From: UA<sip:UA@host.com>
Call-ID: 1234@a.host.com
CSeq: 1 SUBSCRIBE
EVENT: E-mail_Status
Content-Length: 0
```

```
NOTIFY sip: UA@host.com    SIP/2.0
Via: SIP/2.0/UDP 129.5.3.2:5060
To: UA<sip:UA@agent20.com>
From: UA<sip:UA@host.com>
Call-ID: 1234@a.host.com
CSeq: 2 NOTIFY
EVENT: e-mail_104_open
Content-Length: 0
```

SESSION TO TRACK ACTUAL E-MAIL HANDLING TIME

FIELD OF THE INVENTION

The field of the invention relates to communication systems and more particularly to the Internet.

BACKGROUND OF THE INVENTION

Methods of handling calls from clients by large organizations are generally known. Traditionally such calls have been routed through the public switch telephone network (PSTN). More recently, organizations have begun to provide the necessary infrastructure to process calls through the Internet.

In this regard, many organizations now accept e-mails from customers. Typically, the organization will publish a number of e-mail addresses based upon the number of products offered by the organization.

In order to answer e-mails, an organization may provide one or more agents with computer terminals programmed to receive e-mails. The agents may be especially trained to provide information and answer questions regarding client concerns. Each agent may be especially trained to answer questions about one product of the organization or the agents may be cross-trained to address questions about many products.

E-mails to the organization may be distributed to the agents based upon any of a number of different criteria. As an agent completes an e-mail, he/she may be required to signal availability to a host as an indication that he/she is ready to accept a new e-mail. New e-mails may be distributed to the agent with the longest elapsed time since signaling availability or upon skill in handling one or more types of e-mail.

While existing methods of handling e-mails by organizations work relatively well, it is often difficult to measure the productivity of the organization's agents. While measuring the number of e-mails processed per hour may provide some information on productivity, such information may be highly misleading. For example, if a first agent asks for help from a second agent, then the second agent may not receive the credit he/she deserves for helping the first agent. In addition, once an e-mail has been assigned to an agent, there is no known method of determining whether the agent is still working on a response to the e-mail or has left his/her work station for a rest break. Because of the importance of e-mails, a need exists for a better method of tracking the processing of e-mails within organizations.

SUMMARY

A method and apparatus are provided for measuring a time of considering an e-mail message received by an agent of an automatic contact distribution system. The method includes the steps of detecting each opening and closing of the e-mail received by the agent, measuring an elapsed time between each detected opening and closing of the e-mail and summing the measured elapsed times between the openings and closings of the e-mail to provide a cumulative total time for considering the e-mail.

BRIEF DESCRIPTION OF THE DRAWINGS

FIG. 3 depicts a SUBSCRIBE message that may be used by the system of FIG. 1; and FIG. 4 depicts a NOTIFY message that may be used by an agent terminal within the system of FIG. 1.

DETAILED DESCRIPTION OF AN ILLUSTRATED EMBODIMENT

Figure 1:
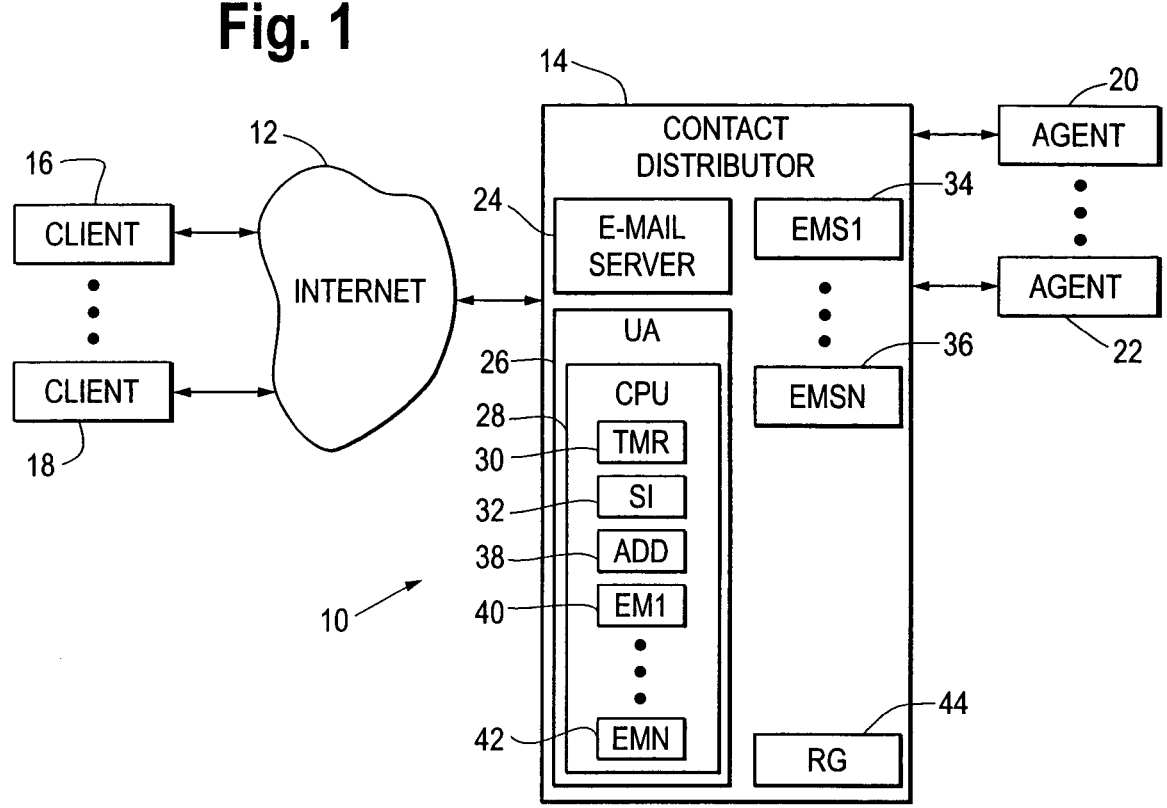
FIG. 1 is a block diagram of a contact distribution system in accordance with an illustrated embodiment of the invention.

FIG. 1 depicts an agent tracking system 10 shown in a context of use in accordance with an illustrated embodiment of the invention. The agent tracking system 10 functions to measure a total actual accumulated time that each agent has worked on each e-mail no matter now many times the agent has opened and closed the e-mail.

As used herein, opening (or activation) of an e-mail means the steps that result in the display of the information content of the e-mail on a display of the agent. Similarly, closing (or deactivation) of the e-mail means the steps that result in the removal of the information content of the e-mail from a display of the agent. The accumulation of the total time that an agent spends considering an e-mail means the cumulative time that the e-mail is open on the agent's screen and the agent is working on addressing the client's concerns.

In this regard each time an e-mail is received, the tracking system 10 creates a SIP session to track the e-mail. Each time the agent opens an e-mail and works on the e-mail, the session associated with the email is taken out of a "hold" state. Each time the agent closes the e-mail, the session associated with the email is placed in a "hold" state.

It should be noted that the submission of a response to the client's e-mail is not a prerequisite to the successful use of the invention. In this regard, the only important factor is the measurement of the time that one or more agents spends considering the e-mail (i.e., reading, researching and possibly responding to the client's concern).

In general, the system 10 may be used by any of a number of different organizations (e.g., commercial, environmental, political, etc.) to advance the agenda of the organization. Access to the organization (and the agents 20, 22 of the organization) may be provided through the Internet 12.

In order to promulgate the agenda of the organization to its clients 16, 18, the organization may publish, by advertising or otherwise, universal resource identifiers (URIs) of one or more e-mail addresses of the organization (where each e-mail address is directed to a different subject matter). For example, where the organization is a manufacturer, the store may publish a different e-mail address for each product made by the manufacturer.

Each e-mail address may by directed to a separate e-mail server 34, 36 within the contact distributor 14. As each e-mail is received, a call type may be determined by an identity of the server 34, 36 to which the e-mail is directed to and by the identity of the sender of the e-mail.

For example, in the case where the organization is a manufacturer, then a separate e-mail address may be provided for the individual products or product lines. By differentiating e-mails based upon products, the identity of the e-mail address inherently provides an indication of the subject matter of the e-mail.

Further, where the manufacturer sells to known customers, the URI of the source of any e-mail provides a indicator of the identity of the sender. By knowing the identity of the sender, records of past purchases may be retrieved and used to provide a reliable indicator of the subject matter of present e-mails.

Once the contact type is determined, an agent may be selected to handle the e-mail. Selection of an agent 20, 22 to handle the e-mail may be based upon any criteria (e.g., agent idle time, skill, etc.).

Once an agent 20, 22 has been selected, The e-mails may be transferred to distributed to the selected agents 20, 22 by a e-mail server 24. Once received by an agent 20, 22, the agent 20, 22 may open and handle the e-mail according to the operating procedures of the organization and the subject matter of the e-mail.

The detection of opening and closing of the e-mails and the determination of the time spent on each e-mail may be handled by a pair of user agents (UAs) 26, 100 within the contact distributor 14 and agent terminal 20, 22. Communication between the UAs 26, 100 and the protocol used in those communications may be accomplished as generally described in RFC #3261 provided by the Internet Engineering Task Force (IETF).

Figure 2:
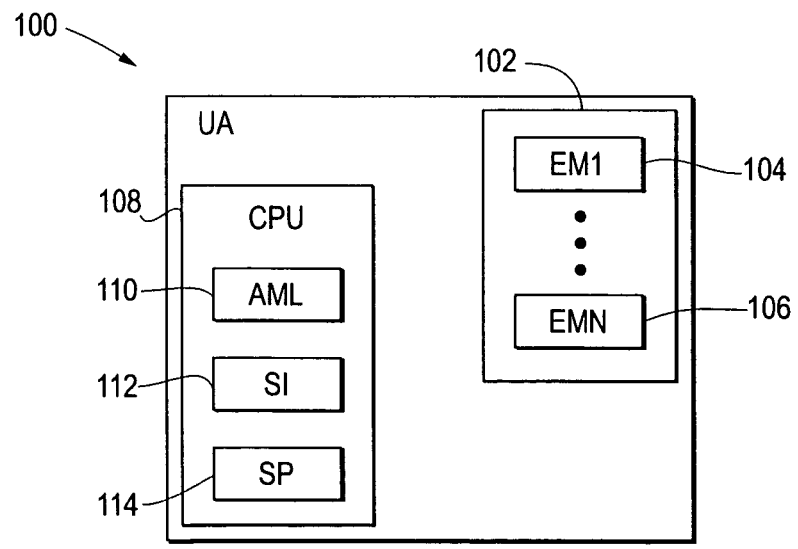
FIG. 2 depicts a user agent that may be used within the terminal of an agent of FIG. 1.

As each e-mail is tracked by the UA 100 (FIG. 2) of an agent 20, 22, the e-mail 104, 106 may be saved within an e-mail database. A e-mail application (e.g., OUTLOOK by Microsoft) 102 may display active e-mails 104, 106 on a terminal of the agent 20, 22.

Within the UA 100 of the agent 20, 22, a selection processor application 114 within a CPU 108 may monitor agent activity. For example, if an agent should place a cursor over an e-mail 104, 106 and activate a selection switch, the selection processor 114 may detect such activity and track the action (e.g. by entering an identifier of the e-mail into an active mail list 110).

Upon supplying an identifier to and activating the e-mail application 102, the e-mail will be displayed on the terminal of the agent 20, 22. The agent 20, 22 may then read, consider and, if appropriate, respond to the e-mail 104, 106.

In order to track the accumulated time that each agent 20, 22 spends on each e-mail 104, 106, the UA 26 of the contact distributor 14 may send a subscription request message 200 (FIG. 3) (as defined within RFC #3261 of the IETF) to the UA 100 of the agent (e.g., agent 20) requesting status update information (E-mail_Status) from the active mail list 110 of each agent 20, 22. The subscription request message 200 may be sent from the contact distributor 14 to the agent terminal 20, 22 each time an agent signs-on.

The UA 100 within the agent 20, 22 may receive the message 200 and route the message to a SIP interface 112 for decoding. When the message 200 is decoded, the UA 100 may determine that the E-mail_Status message is a request for information supplied by a status processor 114 via a SUBSCRIBE SIP method.

In response to the subscription request message 200, the UA 100 will automatically send a NOTIFY event to the status processor 114 each time a change in state occurs.

When ever a change is found (e.g., e-mail 104 has been opened), the status processor 114 may transfer a status change message including an identifier of the e-mail message 104, 106 and an indicator of whether the status change of the e-mail is from closed to opened or opened to closed to the interface 112. In response to the status message, the interface 112 may compose and send a notification message addressed to the UA 20 of the contact distributor 14

If the notification is an open notification, then the UA 26 sends a release message to the session. If the notification had been a close message for the e-mail 104, then the UA 26 will send a "hold" indication to the session. The release and hold indications causes the session to accumulate a time value.

By sending subscribe messages 200 to each agent 20, 22 as they sign onto the contact center 14, the system 10 is able to track the actual time that an agent 20, 22 spends on each individual e-mail. Further, because the subscribe message 200 does not differentiate with regard to the source of the e-mail, if an agent 20, 22 transfers an e-mail to another agent 20, 22 and requests help, then both agents 20, 22 will receive credit for the actual time spent on the e-mail.

Further, by including an identifier of call type with the session 40, 42, reports may be generated within a report generator 44 that relates agent time to call type and ultimately to productivity. For example, by differentiating e-mails by e-mail type, an average time per e-mail may be calculated for each e-mail type for all the agents and for each agent in particular. Differences above the average or mean values for each call type may be used to reward performance or target agents for training or re-training.

A specific embodiment of a method and apparatus for determining a time spent on e-mails has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of measuring a time of considering an e-mail message having information content received by an agent of an automatic contact distribution system wherein the e-mail message is opened and closed a plurality of times such method comprising the steps of:
   detecting each of the plurality of opening and closing of the e-mail received by the agent wherein each opening comprises display of the information content of the e-mail on a display of the agent for consideration of the e-mail by the agent and each closing comprises removal of the information content of the e-mail from the display of the agent;
   measuring an elapsed time between each detected opening and closing of the e-mail; and
   summing the measured elapsed times between the openings and closings of the e-mail to provide a cumulative total time for considering the e-mail.

2. The method of measuring the time of considering the e-mail message as in claim 1 further comprising creating a Session Initial Protocol session to track the e-mail and sending a Session Initial Protocol (SIP) message from the agent to the automatic contact distributor to take the session out of a hold state each time the e-mail is opened and sending a SIP message from the agent to put the session into the hold state each time the e-mail is closed.

3. The method of measuring the time of considering the e-mail message as in claim 2 further comprising sending a Session Initial Protocol subscription request message from a user agent application of the automatic contact distributor to a user agent application of the agent to request status information each time the agent signs on.

4. The method of measuring the time of considering the e-mail message as in claim 3 further comprising activating a SIP NOTIFY event each time a change in state of the e-mail occurs and transferring a notification message including an identifier of the e-mail and a status indicator to the automatic contact distributor.

5. The method of measuring the time of considering the e-mail message in claim 4 further comprising sending a release message to the automatic contact distributor if the notification is an open notification.

6. The method of measuring the time of considering the e-mail message in claim 1 further comprising sending a Session Initiation Protocol event subscription and notification message from the automatic contact distributor to the user agent requesting notification of each opening and closing of the e-mail message.

7. The method of measuring the time of considering the e-mail message in claim 1 further comprising detecting transmission of a response to an originator of the e-mail message.

8. The method of measuring the time of considering the e-mail message as in claim 7 further comprising forwarding the e-mail message to another agent of the automatic contact distributor.

9. The method of measuring the time of considering the e-mail message as in claim 8 wherein the step of forwarding the e-mail message to the other agent of the automatic contact distributor further comprises providing a cumulative total time for considering the e-mail by the other agent.

10. An apparatus for measuring a time of considering an email message having information content received by an agent of an automatic contact distribution system wherein the e-mail message is opened and closed a plurality of times, such apparatus comprising:
    means for detecting each of the plurality of opening and closing of the e-mail received by the agent wherein each opening comprises display of the information content of the e-mail on a display of the agent and each closing comprising removal of the information content of the e-mail from the display of the agent;
    means for measuring an elapsed time between each detected opening and closing of the e-mail; and
    means for summing the measured elapsed times between the openings and closings of the e-mail to provide accumulative total time for considering the email.

11. The apparatus for measuring the time of considering the e-mail message as in claim 10 further comprising means for sending a Session Initial Protocol message from the agent to the automatic contact distributor each time the email is opened.

12. The apparatus for measuring the time of considering the e-mail message as in claim 11 further comprising means for sending a Session Initial Protocol message from the agent to the automatic contact distributor each time the e-mail is closed.

13. The apparatus for measuring the time of considering the e-mail message as in claim 12 further comprising means for activating a timer within the automatic contact distributor each time the e-mail is opened and deactivating the timer each time the e-mail is closed.

14. The apparatus for measuring the time of considering the e-mail message in claim 12 further comprising means for displaying the e-mail message in a display window of a user agent operating on a terminal of the agent.

15. The apparatus for measuring the time of considering the e-mail message in claim 14 further comprising means for sending a Session Initiation Protocol event subscription and notification message from the automatic contact distributor to the user agent requesting notification of each opening and closing of the e-mail message.

16. The apparatus for measuring the time of considering the e-mail message in claim 10 further comprising means for detecting transmission of a response to an originator of the e-mail message.

17. The apparatus for measuring the time of considering the e-mail message as in claim 10 further comprising means for forwarding the e-mail message to another agent of the automatic contact distributor.

18. The apparatus for measuring the time of considering the e-mail message as in claim 17 wherein the means for forwarding the e-mail message to the other agent of the automatic contact distributor further comprises means for providing a cumulative total time for considering the e-mail by the other agent.

19. An apparatus for measuring a time of considering an e-mail message having information content received by an agent of an automatic contact distribution system, such apparatus comprising:
    a status processor adapted to detect each of a plurality of openings and closings of the e-mail received by the agent wherein each opening comprises display of the information content of the e-mail on a display of the agent and each closing comprising removal of the information content of the e-mail from the display of the agent;
    a timer adapted to measure an elapsed time between each detected opening and closing of the e-mail;
    a controller adapted to deactivate the timer between the closings and openings of the e-mail; and
    adder adapted to add the measured elapsed time between each detected opening and closing of the e-mail to obtain a cumulative time for considering the e-mail.

20. The apparatus for measuring the time of considering the e-mail message as in claim 19 further comprising an interface for sending a Session Initiation Protocol message from the agent to the automatic contact distributor each time the e-mail is opened and closed.

21. The apparatus for measuring the time of considering the e-mail message in claim 19 further comprising an interface adapted to send a Session Initiation Protocol event subscription and notification message from the automatic contact distributor to the user agent requesting notification of each opening and closing of the e-mail message.

\* \* \* \* \*